Patented May 19, 1953

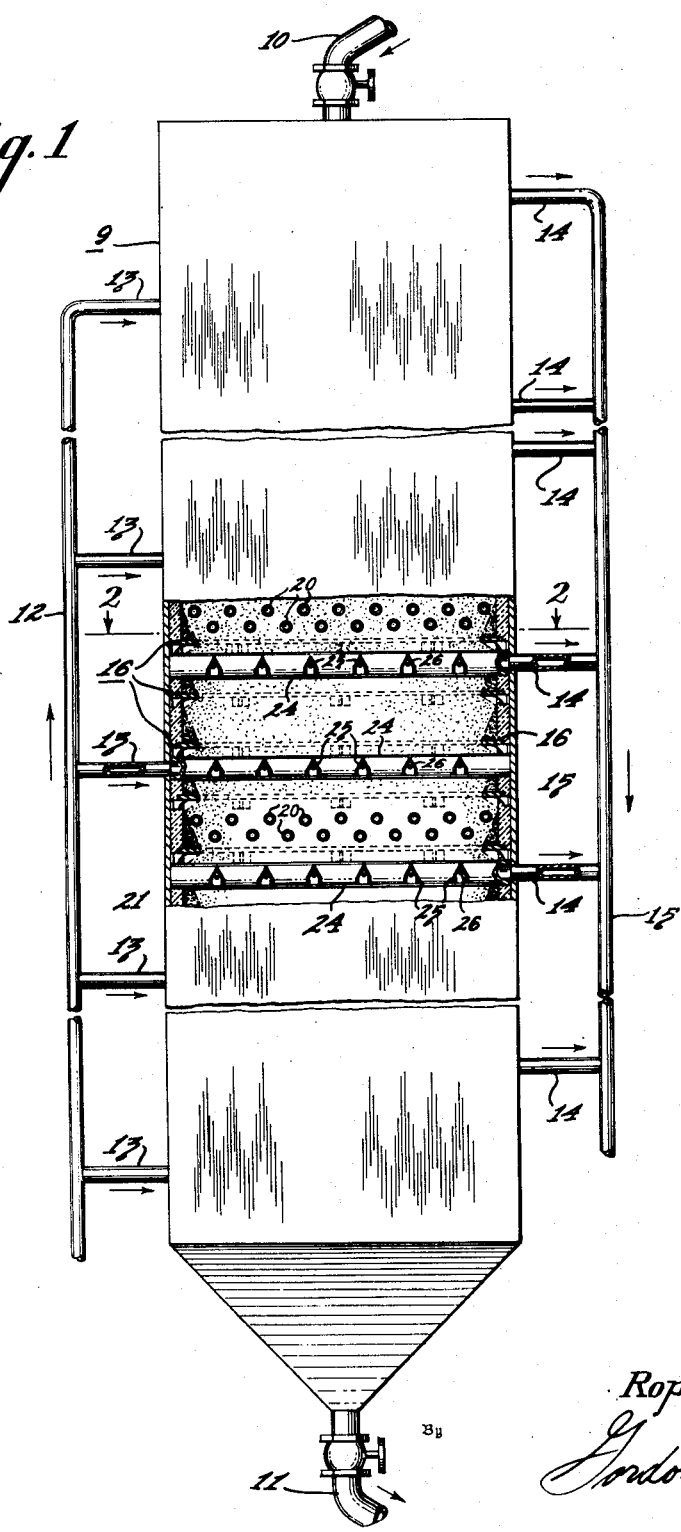

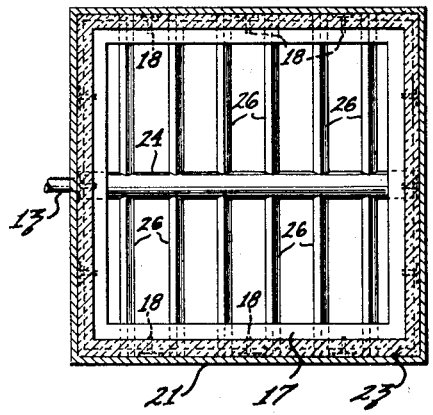
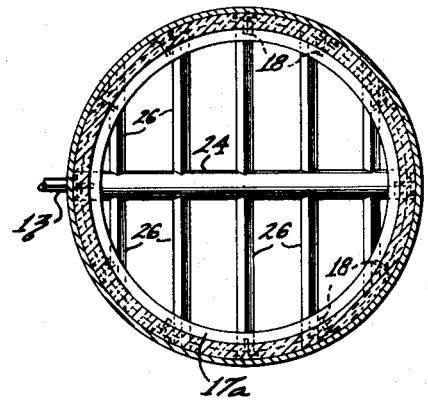
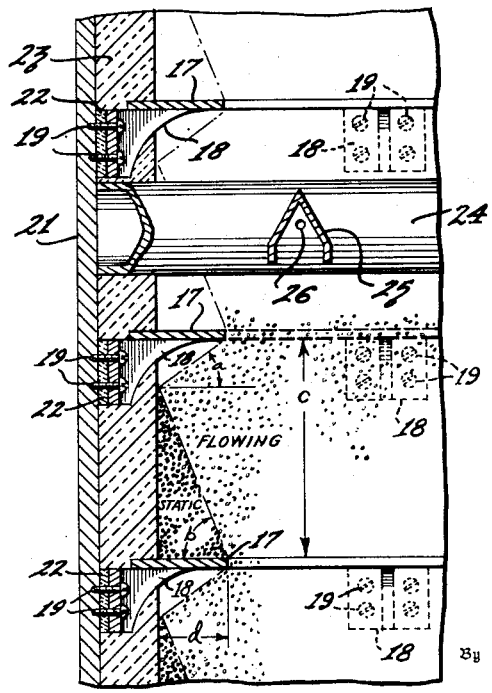
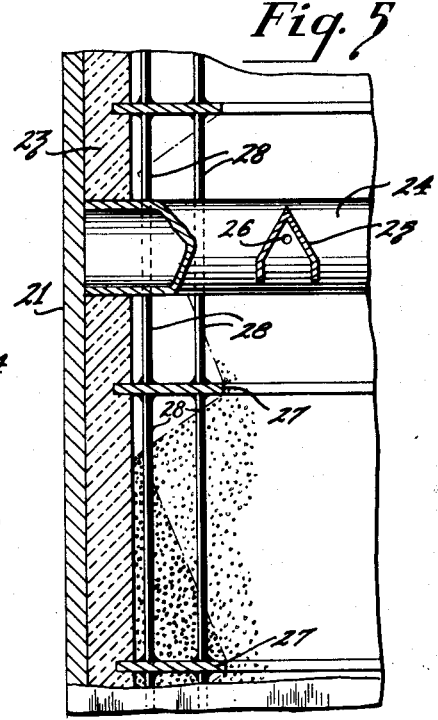

2,639,215

UNITED STATES PATENT OFFICE 2,639,215

ART OF PROTECTING THE WALLS OF VESSELS CONTAINING FLUENT GRANULAR SOLIDS

Rophie E. Bland, New York, N. Y., assignor to Houdry Process Corporation, Wilmington, Del., a corporation of Delaware Application October 11, 1947, Serial No. 779,240

6 Claims. (Cl. 23—1)

This invention relates to imrovements in methods and apparatus employed in the continuous conversion of hydrocarbons wherein hydrocarbons contact granular fluent solid hydrocarbon conversion catalysts.

When hydrocarbons contact a catalyst under conversion conditions including elevated temperatures, such as above 600° F., so as to form conversion products containing hydrocarbons different in molecular weight or structure or both, hydrocarbonaceous material, commonly referred to as coke, is concomitantly deposited on the catalyst and causes a reduction in catalytic activity. The catalyst is therefore periodically regenerated, as by contact with a free oxygen containing gas under combustion conditions, to effect removal of the deposit of coke and thus maintain catalytic activity. Accordingly, the hydrocarbon process may be performed as a continuous operation by use of a technique in which fluent solid hydrocarbon conversion catalyst is circulated in a system comprising a conversion zone and a regeneration zone.

In one method of moving the catalyst through such a system, the solid catalyst is in particulate or granular form, such as spheres or beads, sized particles, cast or extruded pellets or the like, and is sized so that the pressure drop of vapors passed through a bed of such particles is not excessive, a convenient size being such that the bulk of the catalyst will pass a three mesh screen and be retained by an eight mesh screen. Catalyst of such a size is fluent or capable of flowing and may conveniently be passed through a process zone for contact with process fluids as a downwardly moving non-turbulent bed (i. e., the process fluids, even when in countercurrent flow relationship, do not cause turbulence or ebullience of the solids and hence the bed is in compact, unmixed form).

The walls of vessels that contain such moving beds are subject to erosion caused by the abrasive effect of the hard refractory particles of catalyst. In hydrocarbon conversion systems, such as systems in which hydrocarbons higher boiling than gasoline are cracked by contact with a solid refractory cracking catalyst in fluent form, the walls of the vessel are also subject to attack and corrosion at the elevated temperatures of operation, which temperatures are generally above 700° F. in the reactor vessel and above 900° F. in the regenerator vessel or kiln. Corrosion is frequently accelerated by the presence of gases such as hydrogen sulfide and ammonia, or oxides of sulphur, and oxides of nitrogen which are present in the reactor and regenerator respectively when sulphur-containing and nitrogen-containing petroleum crude oil is the source of the hydrocarbon charge.

In accordance with the present invention, I effect operations as above described in vessels in which I protect the walls of the reaction chamber within the vessel by maintaining vertically elongated static masses of the granular fluent solid or catalyst at spaced intervals along the vertical extent of such walls so that the downwardly moving bed is spaced away from and does not contact these walls of the chamber. I flow the granular solid through a vertically elongated reaction chamber or zone equipped with a plurality of narrow horizontal obstructions to the downward flow of the solid at the perimeter of said zone or chamber, such as narrow shelves, which obstructions to flow are substantially contiguous to the wall or lining of the reaction chamber at vertically spaced intervals, and thus form a plurality of vertically elongated static masses of said solid, the boundaries of each of said layers being defined by the wall of the chamber, a short horizontal base, such as that formed by one of said shelves, and a diagonal face inclined to said base at the apparent angle of repose of said solid, as explained below.

The present invention and various embodiments thereof, together with their applications and advantages, are described below in connection with the drawings in which, presented in a schematic manner:

Fig. 1 is an elevation, with parts broken away and in section, of a vessel for the regeneration of coked hyrdocarbon conversion catalyst, the wall of the vessel being protected as herein described;

Fig. 2 is a horizontal section of the vessel in Fig. 1 taken along the line 2—2;

Fig. 3 is a horizontal section, similar to Fig. 2, of a modified vessel used for the same purpose as Fig. 1;

Fig. 4 is an enlarged view of a sectional elevation of a wall of this vessel in Fig. 1 and;

Fig. 5 is a view, similar to Fig. 4, of another modification of the invention.

Shown in Fig. 1, is a regenerator or kiln, indicated generally at 9 to which coked catalyst from a hydrocarbon conversion reactor (not shown) is introduced by conduit 10, regenerated catalyst being removed by conduit 11. Catalyst moves downwardly through kiln 9 as a non-turbulent bed and is regenerated by burning off the coke thereon in a plurality of combustion stages. This type of regeneration is effected by introducing air from a manifold 12 through a plurality of conduits 13, passing the air through the catalyst and removing the flue gases formed by the combustion of the coke by a plurality of conduits 14 communicating with a manifold 15. In order to prevent an excessive rise in temperature to levels that might harm the catalyst, due to the heat of combustion of the coke, cooling coils 20 are provided in the various combustion stages. However, in order to effect rapid regeneration, temperatures above 900° F., such as temperatures of 1000° F. to 1100° F. or even higher, are maintained in the kiln by adjusting the rate of circulation of the indirect heat exchange medium passed through cooling coils 15. Under these conditions, there is frequently considerable erosion and corrosion of the walls of the kiln, even when the walls consist of a high temperature refractory material used as lining.

In accordance with the invention, I provide a plurality of shelves vertically spaced apart and indicated generally at 16 in Fig. 1, which shelves are engaged with the wall of the kiln. As shown in Fig. 4, such a shelf may comprise a metallic strip or shelf 17 which is rigidly affixed, as by welding, to bracket 18 which in turn is bolted by bolts 19 to the metallic outer wall or shell 21 of the kiln, bracket 18 and wall 21 being separated by insulation 22. A layer of high temperature refractory insulation 23, which forms the wall of the reaction chamber, is attached to metallic wall 21 and extends over a portion of metallic strip 17.

Because the shelves are engaged with the refractory lining or wall of the reaction chamber, the granular fluent solid used as catalyst collects on the top of element 17 as shown in Fig. 4. As explained more fully in an article entitled "The TCC catalytic cracking process for motor gasoline production," by R. H. Newton, G. S. Dunham and T. P. Simpson, Transactions of the American Institute of Chemical Engineers, volume 41, page 215, April 25, 1945, when fluent granular solids of the type described above form a static mass under such conditions, the diagonally vertical boundary or face is inclined to the horizontal base (the portion of element 17 outside of the insulation) at the apparent angle of repose. The apparent angle of repose, indicated by angle $b$ in Fig. 4, is generally about 70° or 71°, for particles of the size referred to above. Also as shown in Fig. 4, the fluent solid flowing past the free end of the shelf 17, flows toward the kiln wall, the diagonal face of the fluent mass being inclined to the horizontal at an angle known as the static angle of repose indicated by angle $a$ in Fig. 4. This is the angle commonly measured and commonly referred to as the angle of repose and, for the size of fluent solids referred to above, is about 34° or 35°.

From the geometrical considerations involved, it may be easily calculated that when the shelves are vertically spaced at intervals (indicated by $c$ in Fig. 4) which are approximately 3.6 times the width of the shelf in contact with the solids (indicated by $d$ in Fig. 4), the condition illustrated by Fig. 4 will be obtained. A somewhat greater distance, such as four times the width of the shelf, may be employed, in which event a small portion of the moving bed may contact the wall, but I prefer to employ a spacing less than four times the width of the shelf. Spacings less than 3.6 times the width of the shelf, such as two or three times, may be used advantageously; in which event the cross section of the static mass is trapezoidal instead of the triangular cross section shown in Fig. 4.

The kiln is preferably provided with the shelves herein described without interfering with elements necessary for the introduction and eduction of air and flue gas. As shown in Figs. 1 and 4, the shelves may be spaced above and below a vapor introducing or collecting device such as that illustrated, which device may consist of a manifold 24 and inverted channels 25 communicating therewith through orifices 26. The kiln may be of rectangular or square cross section, as shown in Fig. 2, in which event the shelves are substantially long narrow strips, or the kiln may be circular in cross section, as shown in Fig. 3, in which event the shelves 17a are narrow annular rings. In either event, the shelves of Figs. 2 and 3 are supported by brackets 18 at regular intervals so as to maintain strength and rigidity.

As shown in Fig. 5 the shelves may comprise a plurality of narrow metallic strips 27 spaced apart at regular intervals and made rigid by rods 28 to which they are affixed as by welding. The shelves may be maintained in engagement with the refractory lining 23 by recessing them therein. In the event that the shelves do not remain in engagement with the refractory lining 23, they may be braced against each other.

It will be understood that numerous other modifications of my invention are possible. Thus the shelves may be affixed to a series of vertical strips which in turn are bolted to the metallic wall of the vessel, or insulating layer 22 shown in Fig. 4 may be dispensed with. Alternatively, the shelves may be formed of ceramic material sufficiently strong to hold the granular solid, such as ceramic material which has a metallic core. It will also be understood that many advantages of my invention are obtained when using it in connection with somewhat lower temperatures, such as temperatures above 700° F. which are encountered in hydrocarbon conversion vessels and in some instances the vessels referred to herein may not be equipped with refractory linings, in which event the shelf is constructed so that it is substantially contiguous to the metallic outer wall of the vessel (i. e., if the shelf is not actually engaged with or in abutting relationship to the wall, it is at least close enough to the wall so that little, if any, of the fluent solid flows between the shelf and the wall).

It is to be noted that, because the static masses as described herein form a series of adjacent masses that space the moving bed away from the wall, one may employ a material for the refractory lining which is selected for its ability to insulate with little, if any, regard for its resistance to erosion. Since the optimum values for these properties are not found in a single material, superior insulation is effected. Moreover, when the static masses are employed in a cracking vessel, the static masses of catalyst tend to accumulate coke and form coherent masses having insulating power.

Additionally, in regeneration vessels or kilns whose walls generally need to be protected with refractory linings because of the temperatures involved, any portion of the refractory lining worn away will tend to be replaced with static catalyst, which shortly becomes completely regenerated and therefore tends to be at a lower temperature than the moving bed of catalyst on which coke is burning. In some cases, it may be desirable to dispense with any or all of the refractory lining or merely use it where the static masses do not protect the wall. It is clear that the present invention provides a source of protection to the wall of the vessel that is continuously replaced (as by more catalyst) in the event of erosion.

Obviously many modifications and variations of the invention as hereinbefore set forth may be made without departing from the spirit and scope thereof and therefore only such limitations should be imposed as are indicated in the appended claims.

I claim as my invention:

1. In a vessel wherein a downwardly moving nonturbulent bed of fluent granular solid contacts gases, which vessel comprises inlet and outlet means for continuously introducing and removing said solid, inlet and outlet means for said gases and a vertically elongated chamber for the contact of said solids and gases, the perimeter of said chamber confining said downwardly moving bed, the combination thereof with means for producing vertically elongated substantially static masses of said solid between the walls of said chamber and said bed, said means comprising a plurality of narrow horizontal shelves substantially contiguous to said wall at vertically spaced intervals equal to less than four times the width of said shelves within said chamber.

2. The combination of claim 1 further characterized in that said shelves are supported by elements within said chamber.

3. The combination of claim 1 further characterized in that the vessel is a regeneration vessel for the combustion of coke on a hydrocarbon conversion catalyst, which vessel is adapted to operate at temperatures above 900° F., and is provided with a refractory lining.

4. In a contact zone for the contact of a fluent granular solid with gases at elevated temperatures above 700° F., the method of protecting the wall of said contact zone which comprises continuously flowing said solid vertically downward through at least the major portion of the horizontal cross sectional area of said contact zone as a compact non-turbulent bed, said contact zone being vertically elongated and equipped with a plurality of narrow horizontal obstructions to flow, said obstructions being substantially contiguous to the perimeter of said zone and spaced at short intervals along its vertical extent, and collecting static masses of said solid on each of said obstructions to flow, whereby substantially all of the wall of the chamber confining said bed is protected against erosion and high temperatures.

5. The method of claim 4 characterized in that said narrow horizontal obstructions are vertically spaced at intervals less than four times the width of said obstructions.

6. In a zone through which hot granular solid circulates, the method of protecting a wall of said zone which comprises mechanically stopping during flow small amounts of said solid at successive vertical levels contiguous to the inner periphery of said wall and spaced so as to establish and maintain vertically elongated static masses of said solid along substantially the complete vertical extent of said wall and continuing the flow of the bulk of said granular solid unobstructedly vertically downward in said zone as a continuous non-turbulent bed whereby said bed is spaced from said wall.

ROPHIE E. BLAND.

References Cited in the file of this patent

UNITED STATES PATENTS

| Number | Name | Date |
|--------|------|------|
| 714,843 | Wentz | Dec. 2, 1902 |

FOREIGN PATENTS

| Number | Country | Date |
|--------|---------|------|
| 672,081 | Germany | Feb. 21, 1939 |